H. J. RUFLI.
STREET PAVING APPARATUS.
APPLICATION FILED MAR. 27, 1908.

902,837.

Patented Nov. 3, 1908.
8 SHEETS—SHEET 1.

WITNESSES:
Chas. H. Hagedon
Jessie Thompson

INVENTOR
Herman J. Rufli
BY
Thompson & Bell
ATTORNEY

H. J. RUFLI.
STREET PAVING APPARATUS.
APPLICATION FILED MAR. 27, 1908.

902,837.

Patented Nov. 3, 1908.
8 SHEETS—SHEET 4.

WITNESSES:
Chas. H. Hagedon.
Jessie Thompson.

INVENTOR
Herman J. Rufli
BY
Thompson & Bell
ATTORNEY

H. J. RUFLI.
STREET PAVING APPARATUS.
APPLICATION FILED MAR. 27, 1908.

902,837.

Patented Nov. 3, 1908.
8 SHEETS—SHEET 7.

WITNESSES:
Chas. H. Hagedon.
Jessie Thompson.

INVENTOR
Herman J. Rufli
BY
Thompson & Bell
ATTORNEY

H. J. RUFLI.
STREET PAVING APPARATUS.
APPLICATION FILED MAR. 27, 1908.
902,837.
Patented Nov. 3, 1908.
8 SHEETS—SHEET 8.
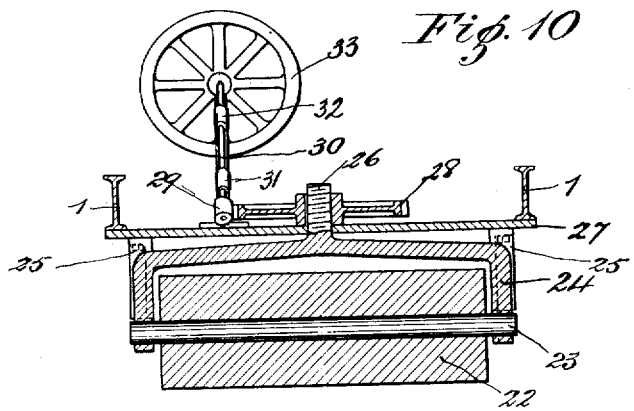
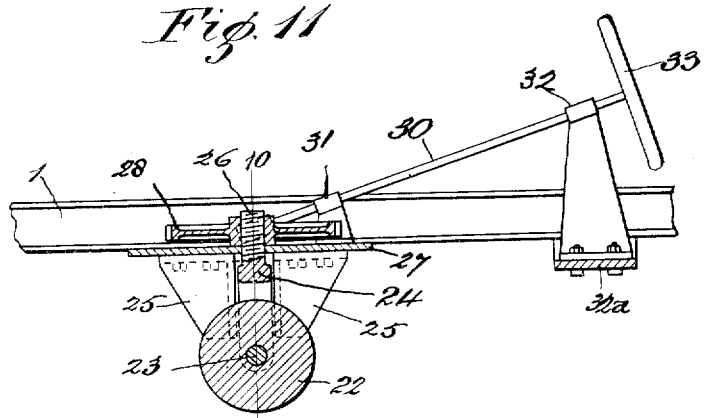
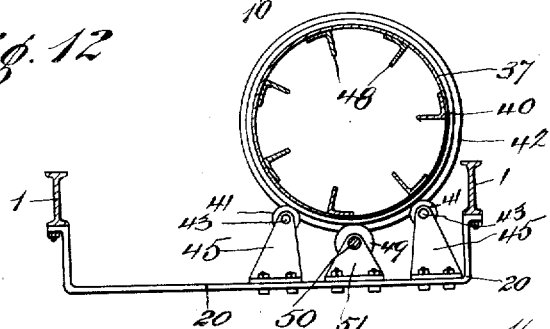
WITNESSES:
Chas. H. Hagedon
Jessie Thompson
INVENTOR
Herman J. Rufli
BY
Thompson & Bell
ATTORNEY

UNITED STATES PATENT OFFICE.

HERMAN J. RUFLI, OF INDIANAPOLIS, INDIANA.

STREET-PAVING APPARATUS.

No. 902,837.　　　　Specification of Letters Patent.　　　Patented Nov. 3, 1908.

Application filed March 27, 1908. Serial No. 423,598.

*To all whom it may concern:*

Be it known that I, HERMAN J. RUFLI, citizen of the United States, residing at Indianapolis, in the county of Marion and State of Indiana, have invented certain new and useful Improvements in Street-Paving Apparatus, of which the following is a specification, reference being had therein to the accompanying drawing.

This invention relates to an apparatus for making streets or roadways as hereinafter described in this specification and particularly pointed out in the claims.

The object of this invention is to provide a portable apparatus embodying means for drying the earth used in preparing the composition to be applied to the surface of the street or roadway, means for heating the bitumen used in said composition to the proper temperature, means for conveying and transferring the bitumen and the dried earth in the proper proportion to the mixing apparatus, and means for mixing the said dried earth and the heated bitumen and delivering the said mixture to be spread on the roadway or street.

I attain these objects by means of the apparatus illustrated in the accompanying drawings in which like numerals of reference designate like parts throughout the several views.

Figure 1:
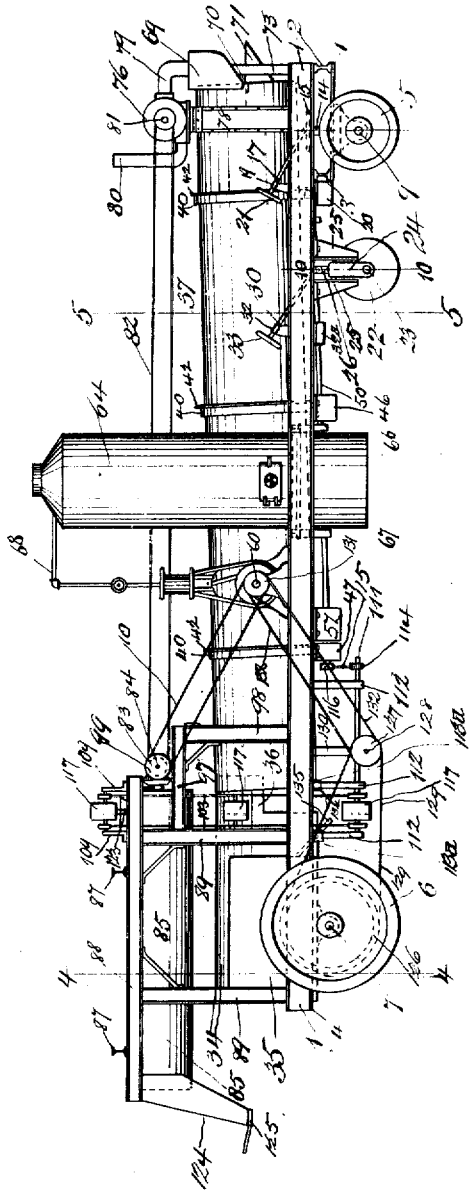
Figure 2:
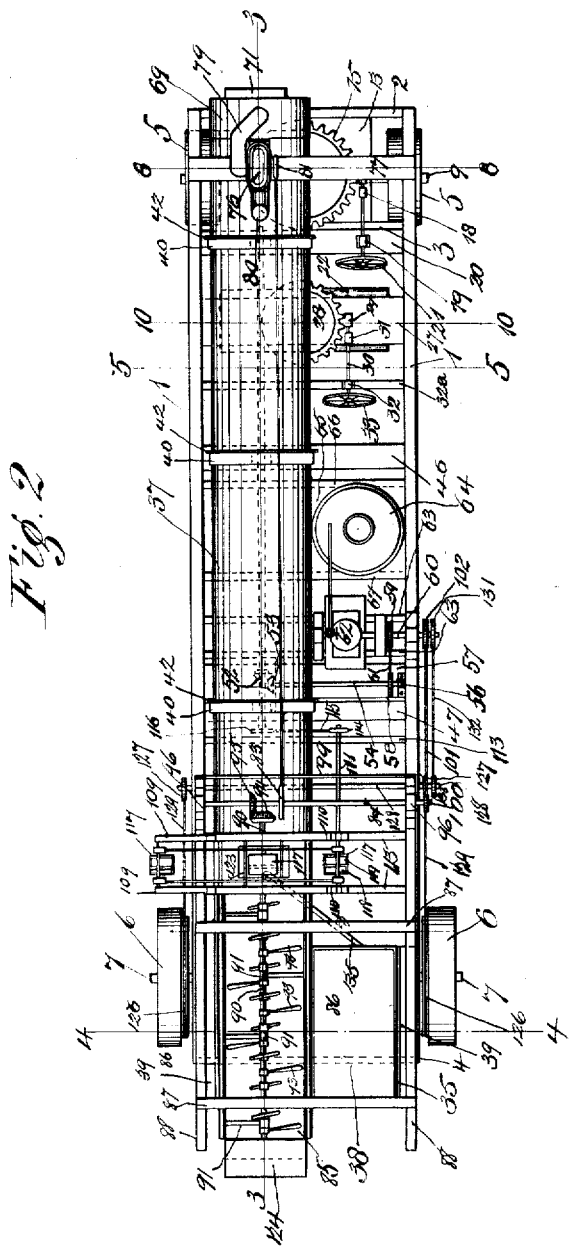
Figure 3:
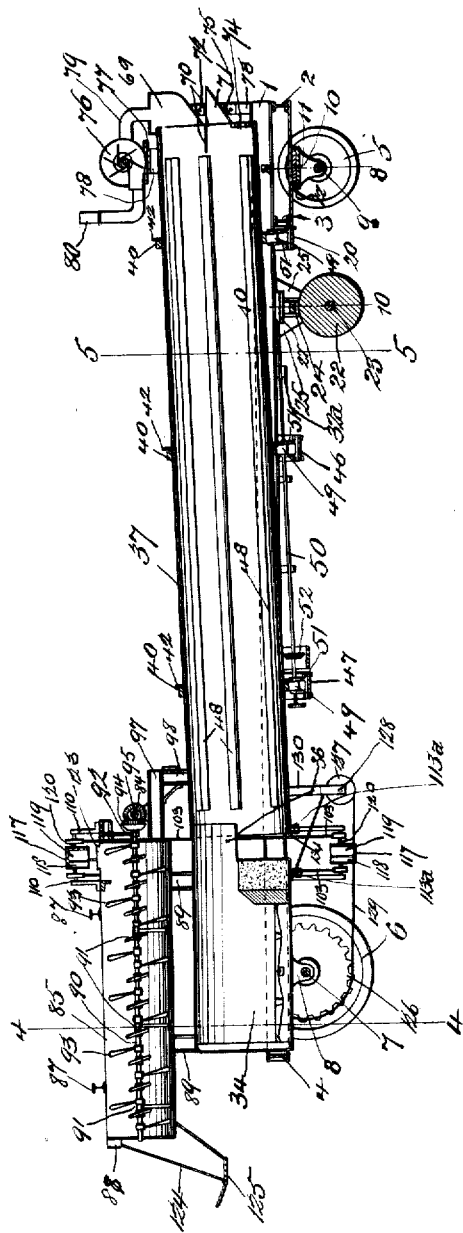
Figure 4:
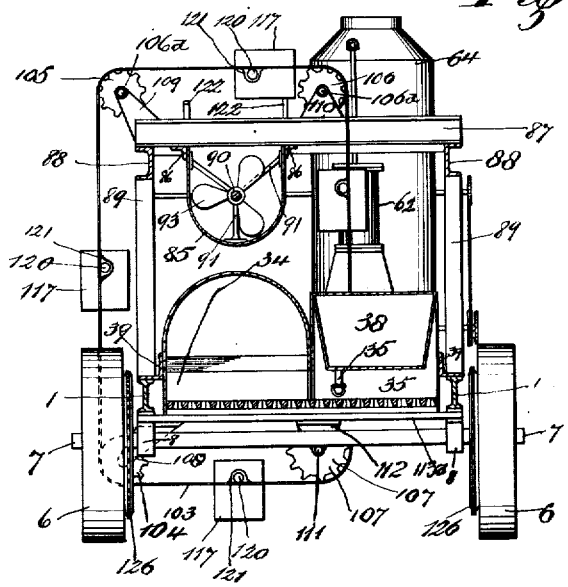
Figure 5:
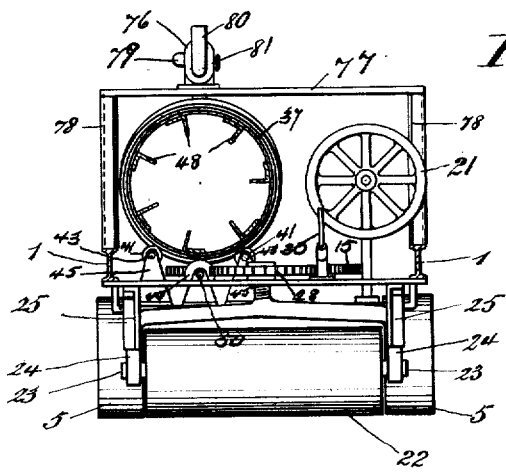
Figure 6:
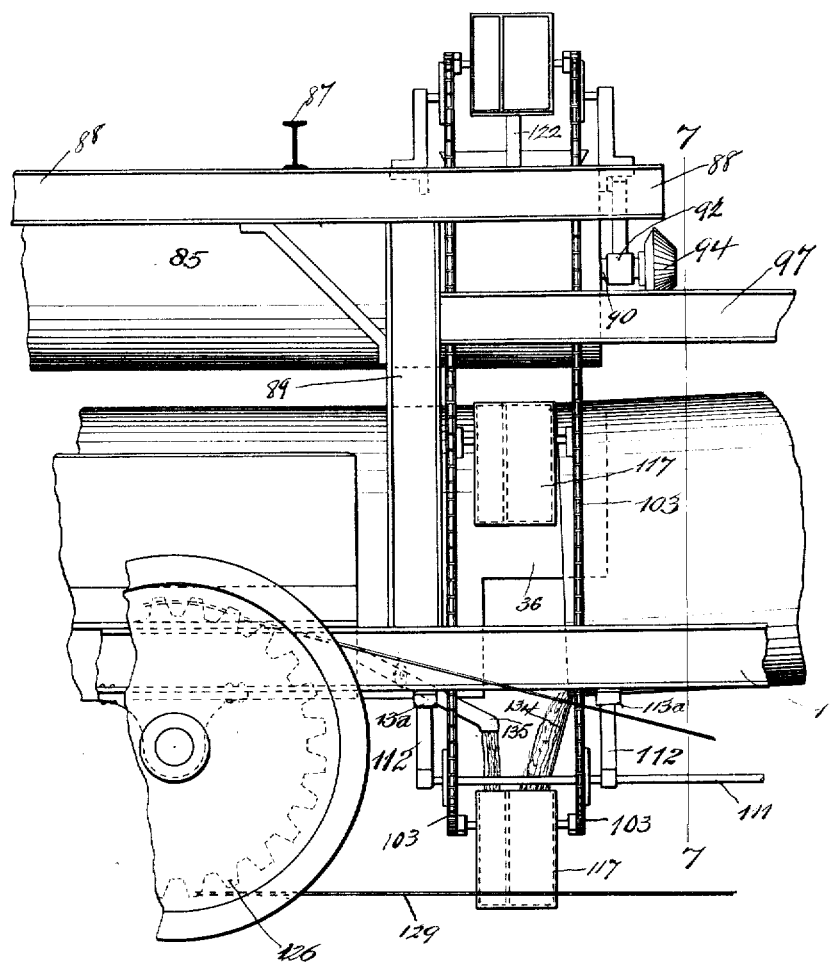
Figure 7:
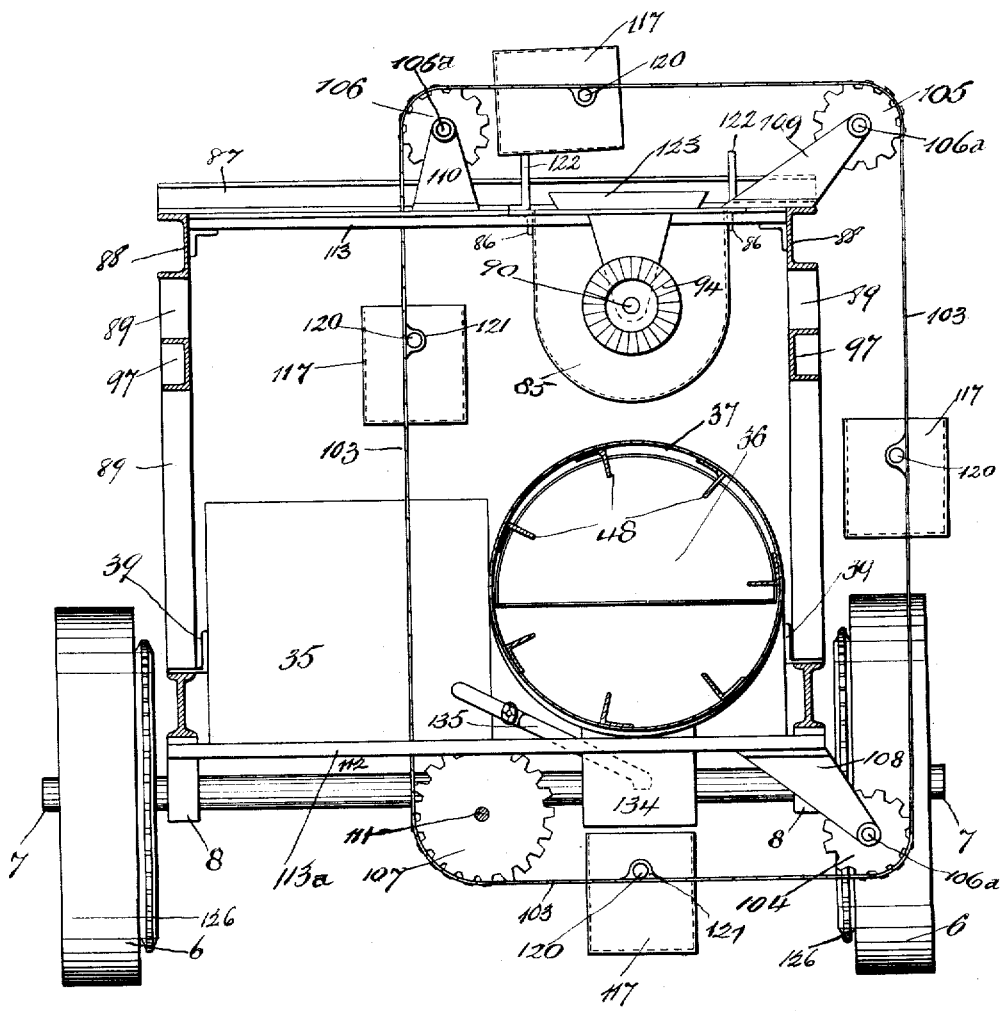
Figure 8:
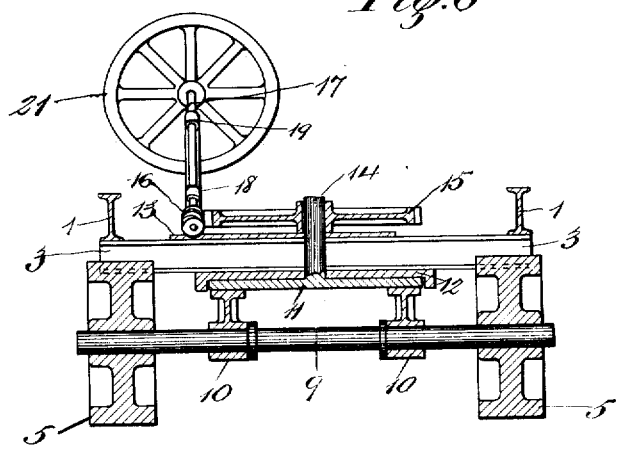
Figure 9:
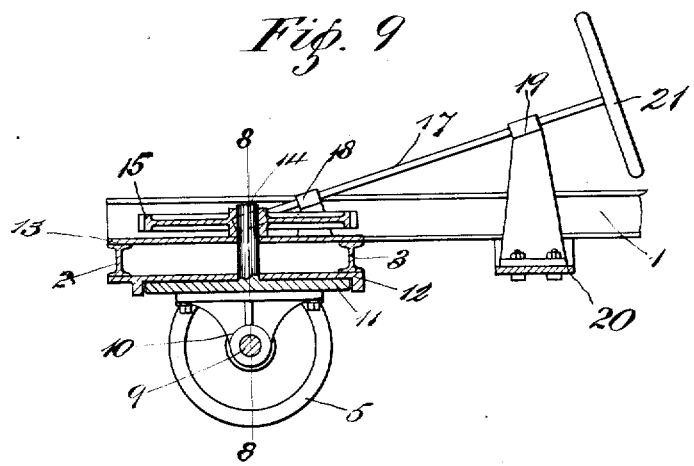

Figure 1 is a longitudinal elevational view of my apparatus; Fig. 2 is a top view of the same; Fig. 3 is a longitudinal sectional view of the apparatus taken along the line 3—3 in Fig. 2; Fig. 4 is a rear end vertical sectional view taken along the line 4—4 in Figs. 1, 2 and 3; Fig. 5 is a front end vertical sectional view taken along the line 5—5 in Figs. 1, 2 and 3; Fig. 6 is an enlarged broken view of a portion of the apparatus showing the means for conveying the prepared bitumen and dried earth into the proper proportions to the mixing means; Fig. 7 is a transverse sectional view of the same taken along the line of 7—7 in Fig. 6; Fig. 8 is a transverse sectional view of the forward end of the machine showing the steering mechanism of the apparatus taken along the line 8—8 in Figs. 1, 2, 3 and 9; Fig. 9 is a broken side view of the same; Fig. 10 is a transverse sectional view of the forward end portion of the apparatus taken along the line 10—10 in Figs. 1, 2, 3 and 11; Fig. 11 is a broken side view of the same; and, Fig. 12 is a transverse sectional view of the forward portion of the apparatus showing the drying cylinder supporting and driving means of the same.

I will now proceed to describe my invention in such full, clear, concise, and exact terms as to enable any person skilled in the art to which it appertains to make and use the same.

The main supporting frame of this apparatus consists of the longitudinally extending side beams 1 provided with the cross tie beams 2, 3 and 4 and said main frame is carried by the forward carrying wheels 5 and the rear wheel 6. The rear wheels 6 are secured on the axle 7 which latter is journaled in the bearings 8 secured to the side beams 1. The forward carrying wheels 5 are secured on the axle 9 to turn therewith and the said axle is supported and journaled in the depending hangers 10 which are secured to the turn-table or fifth wheel 11. The fifth wheel 11 is fitted into the recess of the bearing plate 12 which latter is rigidly secured to the bottom sides of the cross beams 2 and 3. Directly above said plate is situated the plate 13 in which is formed centrally thereof a bore through which the vertically extending neck 14 projects. The said neck 14 is situated centrally on the top surface of the fifth wheel 11, and may be either formed integral therewith or firmly secured thereto, so as to turn therewith, and said neck projects through the bore formed in the fifth wheel bearing plate 12 which bore forms the lower journal bearing for the neck 14. On the top end portion of the neck 14, situated above the plate 13, is secured the worm wheel 15, the teeth of which are engaged by the worm 16. The worm 16 is secured on the lower end of the steering shaft 17 which latter is journaled in bearings 18 and 19. The bearing 18 is secured on the plate 13, and the bearing 19 on the cross bar 20. A steering wheel 21 is secured on the end of the steering shaft 17, and the same is provided for the purpose of turning said steering shaft to direct the course of the apparatus.

To the rear of the forward wheel 5 is situated the roller 22 which is journaled on the axle 23 to turn thereon. The axle 23 is secured at its ends in the ends of the depending arms of the yoke 24 to be supported thereby. The yoke 24 is fitted at its ends between the guiding jaws 25 to slide vertically, and formed centrally thereon and integral therewith is the screw neck 26. The neck 26 projects through the supporting plate 27, and secured on said neck is the worm wheel 28 by which the yoke 24 is raised and lowered to raise the roller above the plane of the surface of the roadway when not in use, or to lower said roller to roll the surface of said roadway preparatory to applying the paving material to the surface thereof. The worm 29 meshes with the teeth of the worm wheel 28 to turn the latter, and said worm is secured on the shaft 30 to turn therewith. The shaft 30 is journaled in and supported by the bearings 31 and 32, and on the said shaft is secured the hand wheel 33 by which said shaft 30 is turned to revolve the wheel 28. The bearing 31 is secured on the plate 27, and the bearing 32 on the cross plate 32$^a$ which latter is secured at its ends to the side beams 1. At the rear end of the apparatus is situated the drying furnace 34 and the bitumen heating furnace 35, which are placed side by side and connected to form a single furnace chamber, which latter chamber is connected at its forward end by the flue way 36 to the rear open end of the drying cylinder 37, so that the heat of said furnace will enter directly into said cylinder at its rear end to remove the moisture from the dirt or other material that may be placed therein. The top of the furnace 34 is of sheet metal, and is arched over the top of the fire, as shown in Fig. 4, and situated over the furnace 35 is the bitumen heating tank 38 which is heated thereby. Extending longitudinally on the outer sides of the furnaces 34 and 35 are the angle irons 39 which are riveted or otherwise secured thereto to form supporting feet for said furnaces which feet are adapted to rest upon the side beams 1 to which they are secured.

The drying cylinder 37 extends longitudinally between the beams 1 and is inclined toward its lower delivering open end, and said cylinder is provided with the angle iron rings 40 which are secured to the outer periphery of said cylinder to turn therewith and said angle irons are adapted to rest upon the supporting friction roller 41 which forms the bearings therefor, and the flanges 42, of which rings are provided to bear against the front sides of said supporting rollers 41 for the purpose of preventing said drying cylinder 37 moving longitudinally backwardly by gravity. The supporting friction rollers 41 are journaled on the arbors 43 and supported and carried by the standards 45, secured to the cross bars 20, 46 and 47 which latter are secured to the side beams 1. The cylinder 37 is provided on its inner peripheral surface with the longitudinally extending angles 48 which are arranged around the inner peripheral surface of said cylinder at intervals apart, and said angles are provided for the purpose of agitating the materials to be dried to an extent to permit the current of hot air, passing through said cylinder 37 from the furnace, to thoroughly dry the dirt or other material passing through the interior of said cylinder.

The cylinder rings 40 rest also on the friction driving rollers 49 to be revolved thereby, and said friction rollers are secured on the driving shaft 50 which is journaled in the bearings 51 secured on the cross bars 20, 46 and 47. The drive shaft 50 is provided with the bevel wheel 52 which meshes with the bevel wheel 53 secured on the counter shaft 54. The counter shaft 54 is journaled in the bearings 55 and 56 secured on the cross plates 57, and on said shaft is secured, to turn therewith, the sprocket wheel 58 which latter sprocket is connected to the sprocket wheel 59 secured on the engine shaft 60 by a suitable sprocket chain drive 61. The engine 62 by which the apparatus is driven may be any type of reversing engine and is mounted and securely bolted to the cross bars 63. The boiler 64 for supplying steam to the engine is mounted on and firmly bolted to the plate 65 which plate rests upon and is secured to cross bars 66 and 67 which latter are secured at their ends to the side beams 1, and the said engine is supplied with steam from the boiler 64 by the steam pipe 68. At the open forward end of the drying cylinder 37 is situated the air collecting hood 69 which covers the top open end portion of said cylinder and laps over the end edge of said cylinder thereof and said hood is provided for the purpose of collecting the damp air and moisture as it is evaporated from the moist dirt or other material passing through the interior of the cylinder 37. A deflecting plate 70 is formed on the bottom side of said hood, and is adapted to project flatwise or horizontally into the forward end position of the cylinder 37, and said plate is provided for the purpose of dividing the forward end portion of said cylinder into an upper air space and a lower dirt receiving space and at the same time confining the dirt to the lower portion of said cylinder and preventing it as it is supplied to the feeding hopper 71 being carried around the interior front portion of said cylinder thereby preventing dust or particles of dried dirt floating in the cylinder, to a great extent, being carried over by the current of hot air. The hood 69 is secured in position relative to said cylinder by the supporting bar 72 secured to the post standards 73. The hopper 71 is situated under the air collecting hood 69, and is secured on the front surface of the lower closure plate 74 of said cylinder, and said hopper and its closure plate 74 are secured to the bar 75 which is secured at its ends to the posts 73 by which said hopper is supported in position.

An exhaust fan 76 is secured on the plate 77 which latter is secured at its ends to the top ends of the standards 78. The standards 78 rest upon and are supported by the side beams 1 to which said standards are firmly secured. The inlet pipe 79 of the exhaust fan 76 is connected to the top portion of the hood 69 to exhaust the moist air or vapor collected therein, and the outlet pipe 80 of said fan may exhaust the air collected by said fan into the atmosphere. The fan shaft is provided with a drive pulley 81 which is driven by a belt 82 extending from the pulley 83 on the counter shaft 84.

The next important feature of this apparatus is the mixing mechanism and the means whereby the dried air and heated liquid bitumen is proportioned, conveyed, and supplied to the mixing mechanism which I will now proceed to describe. The mixing trough 85 is situated to extend longitudinally over the top of the furnace 34 in order to receive the heat therefrom to maintain the dried earth and the hot liquid bitumen contained in said trough at the proper temperature while undergoing the mixing process, and the said mixing trough 85 is provided with the angle irons 86 which extend along the upper edges of said trough and are secured to the cross beams 87 which latter are secured at their ends to the longitudinally extending side beams 88. The beams 88 are secured to the top ends of the posts 89 by which they are supported, and the bottom ends of said posts 89 rest upon and are secured to the side beams 1.

A shaft 90 extends longitudinally in the mixing trough 85 and said shaft is journaled in the journal bearings 91 secured in said troughs. A series of paddles 93 are secured on the shaft 90 to be revolved therewith and said paddles are provided for the purpose of mixing the bitumen and the dried earth and working them to the proper plastic consistency to be applied to the ground. On the end of the shaft 90 is secured the bevel wheel 94 which is adapted to mesh with the bevel gear 45 secured on the counter shaft 84. The counter shaft 84 is journaled in the bearings 96 secured on the beams 97 and said beams are secured at their rear ends to the forward posts 89 by which latter said beams are supported at their rear ends and at their front ends to the top ends of the posts 98, and a tie 99 extends to connect the top ends of the post 98 to rigidly connect them and prevent undue vibration. A sprocket wheel 100 is secured on the counter shaft 84 and a sprocket chain 101 connects the drive sprocket wheel 102 secured on the engine shaft 60 to be revolved thereby.

The elevator chain 103 is adapted to run on the sprocket wheel idlers 104, 105 and 106 and the sprocket wheel drives 107. The idlers 104, 105 and 106 are mounted on their arbors 106ª and carried by the hanger 108 and the upper standards 109 and 110. The sprocket drivers 107 are secured on the counter shaft 111 to turn therewith and said counter shaft is journaled in the hangers 112 secured to and depending from the cross bars 113ª. On the forward end of the conveyer drive shaft 111 is secured a sprocket wheel 114 which is driven by the chain 115 extending from the sprocket wheel 116 secured on the shaft 50. The buckets 117 whereby the dried earth and the liquid bitumen are elevated, conveyed to, and delivered into the mixing trough 85, are each divided into a bitumen containing compartment 118 and an earth containing compartment 119, and said buckets are provided with the trunnions 120 which are journaled in the fixings 121 formed on the links of the elevator chain 103. The trip arms 122 are provided for the purpose of tripping the buckets to dump the contents thereof into the hopper 123 of the mixing trough 85. On the end of the mixing trough is secured a delivering chute 124 on the bottom end of which is situated a valve 125 whereby the discharge of the mixture from the mixing trough 85 is controlled.

The apparatus is propelled by the drive sprocket 126 secured on the rear or trailing wheels 6 and connected to said sprockets are the sprockets 127 secured on the counter shaft 128 by the sprocket chains 129. The shaft is journaled in the hangers 130 secured to and depending from the beams 1.

A sprocket wheel 131 is secured on the engine shaft 60 which drives the sprocket chain 132 connecting the drive sprockets 131 and the sprockets 133 on the counter shaft 128.

A chute 134 is situated at the delivering end of the revolving cylinder 37 and the same is provided for the purpose of directing the dirt to the compartment 119 of a bucket. A discharge pipe 135 extends from the bitumen heating tank 38 and the same is situated so as to discharge the liquid bitumen into the compartment 118 of a bucket as it is moved under it. The use and operation of this invention I will now proceed to describe.

The surface of the roadway is first reduced to the desired grade and this surface is properly rolled to produce a firm smooth surface. This apparatus is then moved into the roadway thus prepared and the engine is started to revolve the drying cylinder 37, the shaft 111 to operate the elevator buckets 117, and the shaft 90 to revolve the heaters 93 in the mixing trough 85. The operator shovels the loose dirt, obtained by grading the surface of the roadway, into the hopper 71 which enters the front end portion of the revolving cylinder 37 and is agitated in its passage from the front end portion of the cylinder to the rear opened discharged end portion thereof is thoroughly dried before being discharged therefrom into the dried dirt receiving compartment 119 of the bucket 117. While the dried dirt is being discharged the heated liquid bitumen is permitted to flow into the bitumen receiving compartment 118 of a bucket 117. The bitumen and dirt receiving compartments are so proportioned relatively to each other that each will contain its proper proportion of bitumen and earth. The bitumen and dried earth thus measured out into the buckets 117 is elevated by the conveyer chain 103 and conveyed in a longitudinal plane across and over the machine which bucket 117 in its passage first contacts with a trip arm 122 which tilts the bucket 117, shown in Figs. 6 and 7, to dump the contents thereof into the hopper 123 from whence it passes into the mixing trough 85 there to be thoroughly worked by the heaters 93 after which the semi fluid composition consisting of earth and liquid bitumen thus mixed pass into the chute 124 from whence it is permitted to escape and fall to the ground upon the surface on which it is spread in an even layer and firmly rolled to form a smooth surface.

I claim:

1. In a paving apparatus, the combination with a supporting frame, wheels upon which said frame is mounted to be portable, a hollow revoluble cylinder having its ends open, and means for revolving said cylinder, of a furnace situated at the delivering end of said cylinder and connected thereto, a discharging hopper at said delivering end of said cylinder, a mixing trough situated above said furnace, a bucket conveying and elevating means, buckets connected to said conveying and elevating means said elevating and conveying means arranged to move the buckets successively under said discharging hopper and thence to said mixing trough to dump the contents thereof therein, a feed hopper situated at the end of said cylinder, an air collecting hood situated over said feed hopper and connected to said cylinder, an exhaust fan connected to said air collecting hood and means for driving said fan.

2. In a paving apparatus, the combination with a supporting frame, wheels upon which said frame is mounted to be portable, a hollow revoluble cylinder having its ends open, friction supporting rollers upon which said cylinder is mounted, a shaft extending longitudinally under said cylinder, driving rollers on said shaft contacting said cylinder to revolve the same, a discharging hopper at the delivering end of said cylinder, of a furnace situated contiguous to the delivering end of said cylinder and connected thereto, a mixing trough extending longitudinally over said furnace a bitumen heating tank situated adjacent to the delivering end of said cylinder, a delivering pipe extending from said bitumen heating tank having its delivering end situated near said discharge hopper, a conveying and elevating means, buckets connected to said conveying and elevating means, said buckets each divided into a bitumen receiving compartment and a dry earth receiving compartment, said conveying and elevating means arranged to move said buckets successively under said discharging hopper and said bitumen discharging pipes and thence to and over said mixing trough to dump the contents thereof in said trough, means for dumping said buckets to discharge the contents thereof into said trough, a feed hopper situated at the feed end of said cylinder, an air collecting hood situated over said hopper and connected to said cylinder, an exhaust fan connected to said air collecting hood, and means for driving said exhaust fan.

3. In a paving apparatus, the combination with a supporting frame, wheels upon which said frame is mounted to be portable, a hollow revoluble cylinder having its ends open, friction supporting rollers upon which said cylinder is mounted, a shaft extending longitudinally under said cylinder, driving rollers on said shaft contacting said cylinder to revolve the same, means for revolving said shaft, a discharging hopper at said delivering end of said cylinder, of a furnace situated at the delivering end of said cylinder and connected thereto, a mixing trough having its top side open said trough situated to extend longitudinally above said furnace, a revoluble beater shaft extending longitudinally in said trough, beaters arranged along said shaft, means for revolving said shaft, a bitumen heating tank situated adjacent the delivering end of said cylinder, a delivery pipe extending from said bitumen heating tank having its delivering end situated near said hopper, a bucket conveying and elevating means, buckets connected to said conveying and elevating means, said buckets each divided into a bitumen receiving and a dry dirt receiving compartment, said conveying and elevating means arranged to move said buckets successively under said discharging hopper and said bitumen discharging pipe and thence to and over said mixing trough to dump the contents of said buckets into said trough, trip arms for dumping said buckets over the open side of said trough to discharge the contents thereof into the same a feed hopper situated at the feed end of said cylinder, an air collecting hood situated above said hopper and connected to said cylinder, an exhaust fan connected to said air collecting hood, and means for driving said fan.

4. In a paving apparatus, the combination with a supporting frame, forward steering wheels situated under the front end portion of said frame whereby said front end is supported, at a roller situated under said frame to the rear of said steering wheels, means for raising and lowering said roller relative to the surface of the ground, driving wheels situated under the rear end portion of said frame whereby said rear end portion is supported and carried, an engine carried by said frame and means connecting said rear driving wheels and said engine whereby the apparatus is moved from place to place.

In testimony whereof I affix my signature in presence of two witnesses.

HERMAN J. RUFLI.

Witnesses:
 THOMPSON R. BELL,
 FRANCIS M. SPRINGER.